April 27, 1948.　　　　F. FAHLAND　　　　2,440,437

CROSSBAR SUPPORT FOR VEHICLES

Filed Jan. 7, 1947

Inventor
Frank Fahland

Attorneys

Patented Apr. 27, 1948

2,440,437

UNITED STATES PATENT OFFICE 2,440,437

CROSSBAR SUPPORT FOR VEHICLES

Frank Fahland, Omaha, Nebr.

Application January 7, 1947, Serial No. 720,551

6 Claims. (Cl. 105—369)

This invention relates to crossbar supports for vehicles, and provides an improved locking lug mechanism particularly intended for use with crossbar supports of the type disclosed in my prior application Serial No. 589,729, filed April 23, 1945, but capable of other uses.

The prior application, above identified, describes and claims a crossbar for use in boxcars and the like to hold lading in place. The walls of the car, which are of sheet steel, are formed with rows of apertures intended to be engaged by beam locking means. Each such beam carries at each end two locking means, each of which engages in a corresponding one of two distinct apertures. These devices are engaged serially, and the first engaged is a hook hinged on an axis transverse to the bar, the curved nose of the hook entering an aperture in the side wall, as the hook swings into contact with a lateral face of the bar. The second engaged locking means is a bolt which slides longitudinally of the bar. After the hook is engaged the bolt is projected through an aperture in the wall and turned, so that a lug on the end of the bolt inhibits its incidental retraction. Obviously the hook cannot swing in a disengaging direction until the bolt is retracted.

In the prior device the hinge pin, on which the hook was mounted, was a load-bearing member, and because the hook was necessarily of considerable length, thus affording a force multiplying leverage, the unit pressures on the pin were large. Under these conditions vibration of the car caused wear. Moreover, distortion of the car walls, if substantial, sometimes caused difficulty in engaging and disengaging the hooks.

The present invention avoids these difficulties. The hinge pin is not a load-bearing member, but merely a part of a pin-and-slot hinge connection which allows the hook to accommodate itself to the width of the car. Transverse loads are taken by lugs which interengage as the hook swings to bar sustaining positions. Stop lugs limit entrance of the hook through the aperture in the car wall. As a consequence easy disengagement of the hook is assured. The pin-and-slot connection facilitates engagement.

A preferred embodiment of the invention is illustrated in the accompanying drawing, in which.

Figure 5:
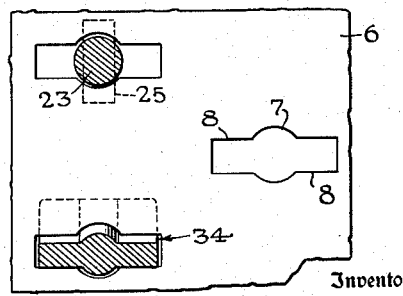
Fig. 5 is a section on the line 5—5 of Fig. 3.

Apertured liner plates for boxcars and the like are known and a fragment of one known type of liner plate is indicated at 6 in Fig. 5. It has rows of staggered apertures each comprising a central circular portion 7 and rectangular wings 8.

Figure 1:
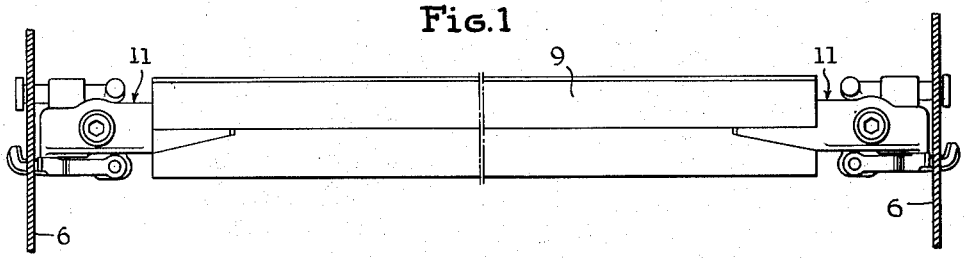
Fig. 1 is an elevation of a crossbar mounted between the side walls of a car. The mid-portion of the bar is broken away to reduce the width of the figure.
Figure 2:
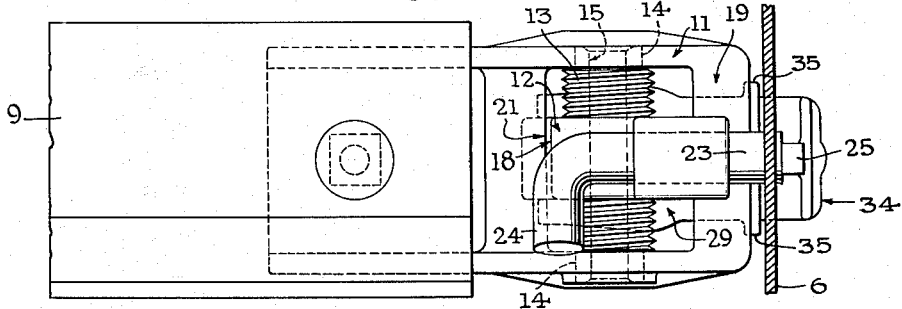
Fig. 2 is a plan view of the right-hand end of the bar shown in Fig. 1, drawn on a larger scale. The side wall of the car is shown in section.

These apertures are used to receive sustaining means in the ends of beams, one of which is generally indicated by the numeral 9 in Fig. 1. The beam so illustrated conforms generally to the disclosure of the prior application. At opposite ends of beam 9 are fittings 11, which when viewed in plan are rectangular yokes in which a block 12 is confined and guided to move in a direction transverse to the beam. To move the block 12 a screw 13 is threaded in the block, and journaled at both its ends in portions of fitting 11. The journals appear at 14. A hexagonal hole 15 is formed through the length of the screw 13 to receive a key or wrench, by which the screw may be turned.

The parts so far described are identical in function with similar parts described and claimed in the prior application and no novelty is claimed for them in the present application.

The transverse adjustment of block 12, though useful, is not essential to the present invention, and in further discussion and in the claims, block 12 will be treated as a portion of the end of beam 9.

Figure 3:
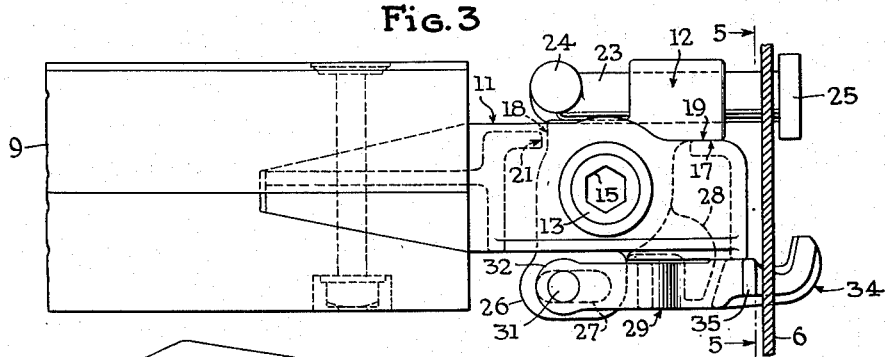
Fig. 3 is a view in elevation of the parts shown in Fig. 2.
Figure 4:
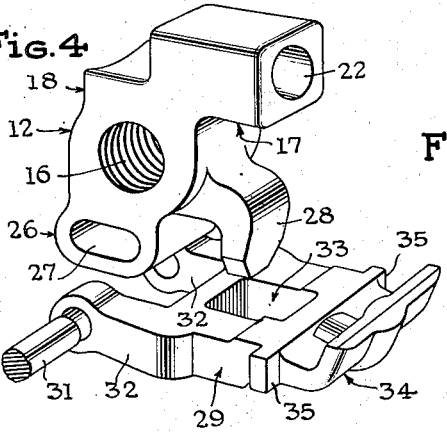
Fig. 4 is a perspective view of the transversely adjustable block which carries the hook and the bolt. In this view the hook is shown and a portion of the pin, both released from the block by withdrawal of the pin.

The form of block 12 is best shown in Fig. 4. The threaded aperture 16 is that which receives screw 13. The shoulders 17 and 18 engage guiding surfaces 19 and 21 in fitting 11 (see Fig. 3) and hold the block against rotation about the axis of screw 13.

The guideway 22 receives a bolt 23 which is slidable in the direction of the length of beam 9. It may be shifted axially and may be rotated through about 180° by a handle 24. At its end it has a crossbar 25 which will pass through aperture 8—7—8 only when handle 24 is substantially vertical.

The guideway 22 is shown located at the upper side of block 12. Opposite this and hence at the lower side of the block is a lug 26 with slot 27. Formed on lug 26 is an alining lug 28. A hook member generally indicated by the numeral 29 is hinged by pin 31 to lug 26. The pin passes through two arms 32 on the hook and through slot 27.

The arms 32 closely embrace the lug 26, and a rectangular aperture 33 in hook 29 receives and laterally confines lug 28 when the hook is swung up to horizontal position against the block 12 (see Fig 3). The aperture 33 is elongated, so that when the hook 29 is in the position of Fig. 3 it may move lengthwise of the beam 9 to the extent permitted by the pin-and-slot hinge-connection 27, 31, but the lugs 26, 28 function as load-bearing members and prevent motion in the direction of the axis of pin 31. Thus this pin is not subjected to load.

The extreme end of member 29 is hooked as indicated at 34 and has a cross-section similar to, but slightly smaller than apertures 6—7—8 (see Figs. 4 and 5). Stop shoulders 35 limit the entrance of the hook into the aperture, a feature which is peculiarly desirable because of the pin-and-slot mounting of the hook. If the hook should work in too far, the hook would tend to cramp in the apertures during disconnection of the beam.

To mount a beam in place, the bolts 23 are retracted and the hooks 29 are pendant. The hooks 29 are started into appropriate apertures and the beam is lowered until it rests on the hooks. Then the bolts 23 are projected through adjacent apertures (which will register) and are turned to lock them.

The screws 13 may then be turned to shift the beam horizontally, assuming such screws are present. Their omission is possible.

To remove the beam, the bolts 23 are released and withdrawn. Lifting of the beam causes the hooks 29 to disengage, and the beam is free.

The present invention has all the advantages of the prior construction, and in addition makes the beam easier to apply and release, particularly in cars whose lining has been bent or distorted. The lugs 26, 28 give better strength and relieve the hinge pin of load.

Obviously slavish adherence to details of the illustrated embodiment is not necessary to avail of the advantages of the invention, and modifications within the scope of the claims are contemplated.

What is claimed is:

1. A locking unit for connecting a beam releasably with an apertured support, comprising, in combination with the beam, a hook member having a curved end adapted to enter an aperture in said support as the hook member is swung about an axis transverse to the beam; a pin-and-slot connection between the hook and a lateral portion of the beam, arranged to guide said hook in such swinging motion and into contact with said lateral portion at the limit of such swinging motion, the pin-and-slot connection being so arranged that, at least when the hook is in contact with the beam, the hook may move in the direction of the length of the beam through a range defined by said connection; means having thrust surfaces substantially parallel with the imaginary plane described by the longitudinal axis of the hook as the hook swings, and arranged to interengage when the hook is in contact with the beam and inhibit lateral motion of the hook relatively to the beam in directions transverse to said imaginary plane without resisting longitudinal movement of the hook; and a bolt projectible endwise from the end of the beam into another aperture in said support.

2. The combination defined in claim 1 in which the pin-and-slot connection comprises a beam-carried slot and a pin fixed in the hook and shiftable in said slot.

3. The combination defined in claim 1 in which the slot of the pin-and-slot connection is formed in a lug projecting laterally from the beam, and the hook has a bifurcated end which straddles the lug and in which the pin is fixed.

4. A locking unit for connecting a beam releasably with an apertured support, comprising, in combination with the beam, a hook member having a curved end adapted to enter an aperture in said support as the hook member is swung about an axis transverse to the beam; stop means arranged to limit the entrance of said hook into an aperture; a pin-and-slot connection between the hook and a lateral portion of the beam, arranged to guide said hook in such swinging motion and into contact with said lateral portion at the limit of such swinging motion, the pin-and-slot connection being so arranged that, at least when the hook is in contact with the beam, the hook may move in the direction of the length of the beam through a range defined by said connection; means having thrust surfaces substantially parallel with the imaginary plane described by the longitudinal axis of the hook as the hook swings, and arranged to interengage when the hook is in contact with the beam and inhibit lateral motion of the hook relatively to the beam in directions transverse to said imaginary plane without resisting longitudinal movement of the hook; and a bolt projectible endwise from the end of the beam into another aperture in said support.

5. The combination defined in claim 4 in which the slot of the pin-and-slot connection is formed in a lug projecting laterally from the beam, the hook has a bifurcated end which closely embraces said lug, and in which the pin is fixed, and the means which interengage when the hook is in contact with the beam are located between the pin-and-slot connection and the stop means and close to the latter.

6. Means for locking the end of a beam to an apertured plate-like support comprising with the beam, two bearer members carried by the beam, and each capable of limited motion in the direction of the length of the beam while engaged with said support, one of said members being a hook loosely hinged to a lateral face of the beam, and formed to engage in an aperture in the support while swinging into load sustaining engagement with said lateral face of the beam, and the other of said members being a bolt projectible in the direction of the length of the beam through another aperture in said support, said bolt being rotatable and having a locking lug which may be positioned to inhibit its retraction from said projected position.

FRANK FAHLAND.

REFERENCES CITED

The following references are of record in the file of this patent:

UNITED STATES PATENTS

| Number | Name | Date |
|---|---|---|
| 2,268,394 | Hebert | Dec. 30, 1941 |
| 2,354,861 | Hermann | Aug. 1, 1944 |
| 2,425,875 | Hermann | Aug. 19, 1947 |